Sept. 23, 1969  A. S. ROBINSON ET AL  3,468,653
LATERAL CONFINEMENT AND FLOW HALTING APPARATUS
FOR MANUFACTURE OF FLAT GLASS
Filed March 17, 1966  2 Sheets-Sheet 1

Inventors
Albert Sidney Robinson
Jack Lawrenson
By
Morrison, Kennedy & Campbell
Attorneys United States Patent Office 3,468,653
Patented Sept. 23, 1969

3,468,653
LATERAL CONFINEMENT AND FLOW-HALTING APPARATUS FOR MANUFACTURE OF FLAT GLASS
Albert Sidney Robinson, Birkdale, Southport, and Jack Lawrenson, Windle, St. Helens, England, assignors to Pilkington Brothers Limited, Liverpool, England, a corporation of Great Britain
Filed Mar. 17, 1966, Ser. No. 535,089
Claims priority, application Great Britain, Mar. 22, 1965, 12,066/65
Int. Cl. C03b 18/02
U.S. Cl. 65—99                                     1 Claim

ABSTRACT OF THE DISCLOSURE

Apparatus for the manufacture of flat glass in ribbon form wherein, after initial lateral confinement of the glass and free lateral flow on the bath, the lateral flow of the glass is physically halted and the glass advanced by means including edge rolls or the like inside the flow-halting means.

Figure 1:
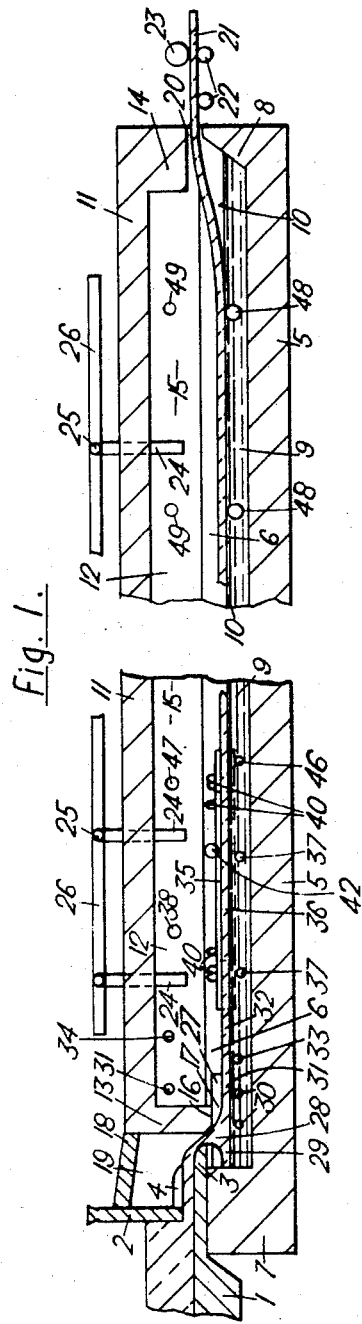

This invention relates to the manufacture of flat glass, and more especially to the manufacture of flat glass during which glass in ribbon form is advanced along a molten bath having a specific gravity greater than the glass and presenting a substantially frictionless surface to the glass.

The molten bath is preferably a bath of molten metal, for example molten tin or a tin alloy having a specific gravity greater than glass. For example the bath is preferably so constituted as to have all the characteristics fully described in U.S. Patent No. 2,911,759.

It is a main object of the present invention to provide an improved method and apparatus for manufacturing flat glass in different commercial thicknesses which glass has a fire finish lustre and freedom from distortion.

According to the invention there is provided a method of manufacturing flat glass from molten glass on a molten bath of higher specific gravity than the glass and presenting a substantially frictionless surface to the glass, comprising pouring molten glass at a controlled rate on to the bath, containing the glass arriving on the bath as a hot body of molten glass during the initial period of its advance along the bath, then permitting free lateral flow of the molten glass as a layer on the bath, physically halting the lateral flow of the released molten glass across the bath when the advancing layer of molten glass has achieved a predetermined thickness, continuing to advance the layer at that thickness by applying traction to the layer, and thermally stabilising the layer as it is further advanced.

The containing of the molten glass arriving on the bath as a body of molten glass at a high temperature as it is advanced along the bath permits the hot glass to settle down on the surface of the bath and achieve a degree of parallelism of its surfaces. The subsequent free lateral flow of the hot glass as it is released from the downstream end of the contained body of molten glass, and further settling down of the hot glass on the surface of the bath during its further advance at the predetermined thickness after its free lateral flow has been physically halted ensures that the thick glass so produced, that is flat glass of 8 mm. thickness or more, has flat, parallel surfaces and is free from distortions.

The traction effort applied to the layer of molten glass which is achieved when the lateral flow of the molten glass is halted, may be just sufficient to advance the layer of glass without altering the thickness of the glass so that the thickness of the glass, when its lateral spreading is halted is the desired thickness for the ultimate ribbon of glass to be produced. The glass having this thickness is cooled as it is advanced until the viscosity of the glass is such that no further dimensional change can take place, and the ribbon of glass so produced is not freed from lateral constraint until it has achieved this viscosity.

However, the traction effort may be such that there is acceleration of the glass and the thickness of the glass is further reduced as the layer of glass is advanced along the bath, and the rate of cooling of the glass as it is advanced is such that the glass has a viscosity at which no further dimensional change can take place when it has achieved the ultimate thickness of the glass to be produced.

In a preferred embodiment of the invention the lateral flow of the released molten glass is arrested by non-wettable surfaces between which the layer is advanced. Traction effort is applied to the layer of glass by conveying rollers located beyond the outlet from the bath through which the ultimate ribbon of glass is withdrawn from the bath. The traction effort to assist the advancement of the layer between the non-wettable surfaces is applied to the upper surface of the margins of the layer of glass.

Further according to the invention apparatus for use in the manufacture of flat glass in ribbon form, comprises an elongated tank structure containing a bath of molten metal, means for delivering molten glass on to the middle area of the bath, means for confining the hot body of molten glass so formed on the bath to that middle area as it is advanced along the bath, temperature regulators mounted relative to the bath to maintain the hot glass in molten condition as it is released from said confining means thereby permitting free lateral flow of the released molten glass, laterally-adjustable non-wettable walls mounted in the tank structure downstream of said confining means to define a laterally-adjustable channel for the glass down the bath, means for adjusting the position of said walls to prescribe a channel width which halts said free lateral flow of the molten glass, and ancillary means for engaging the margins of the layer of glass so formed to assist the advance of the layer along the channel.

Preferably the non-wettable walls are two series of hollow channel-section carbon blocks mounted end-to-end and dipping into the bath surface to define said channel, which blocks are carried on adjustable tubular arms extending through the side walls of the tank structure so that the blocks can be cooled by circulating cooling fluid through the arms.

In order to provide additional traction effort assisting the advancement of the layer of molten glass between the non-wettable surfaces edge rolls may be mounted at each side of the channel just in front of the carbon blocks so as to engage the top surface of the margins of the layer of molten glass in the channel.

Figure 3:
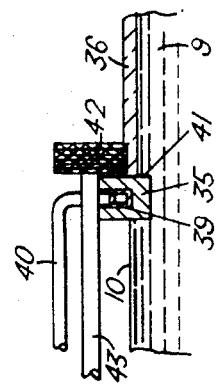
Figure 2:
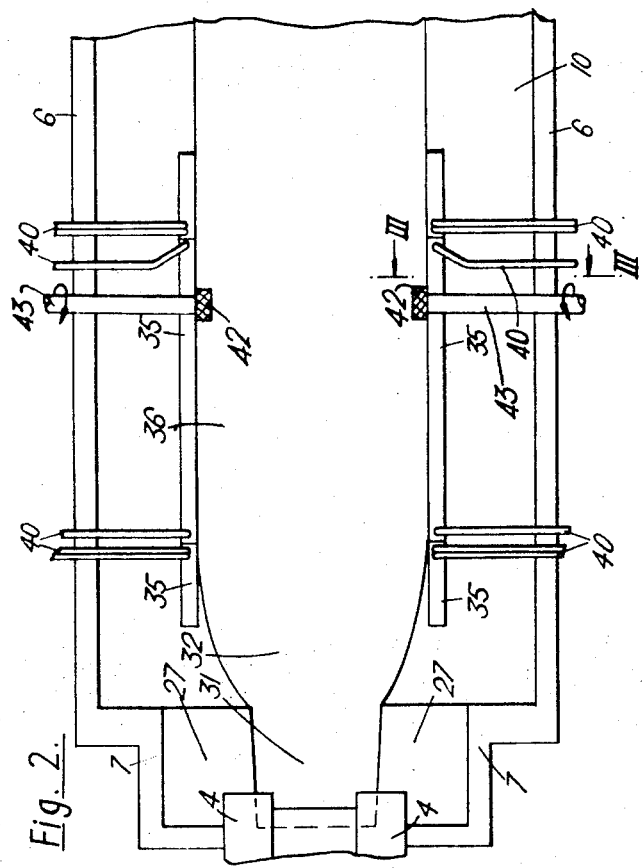

In order that the invention may be more clearly understood an embodiment thereof will now be described, by way of example, with reference to the accompanying diagrammatic drawings in which:

FIGURE 1 is a central longitudinal sectional elevation of apparatus according to the invention, comprising an elongated tank structure containing a bath of molten metal, and a superimposed roof structure, and showing the position of non-wettable blocks defining a channel down the bath, FIGURE 2 is a plan view of the tank structure of FIGURE 1 showing the channel for the molten glass defined by water-cooled fenders disposed in the tank structure, and FIGURE 3 is a section on line III—III of FIGURE 2.

Referring to FIGURES 1 and 2 of the drawings a forehearth of a continuous glass melting furnace is indicated at 1 and a regulating tweel at 2. The forehearth ends in a spout comprising a lip 3 and side jambs 4. The lip 3 and side jambs 4 form a spout of generally rectangular cross-section. A cover may be secured over the spout in known manner.

The spout 3, 4 is disposed above the floor 5 of a tank structure including side walls 6 joined together by end walls 7 and 8 integral with the floor 5 and the side walls 6. This tank structure contains a bath 9 of molten metal, for example molten tin or an alloy of tin having a specific gravity greater than glass. The level of the surface of the bath is indicated at 10.

A roof structure is supported on the tank structure and the roof structure includes a roof 11, side walls 12, and end walls 13 and 14 respectively at the inlet and outlet ends of the bath. The roof structure thus provides a tunnel over the bath and defines a headspace 15 over the bath. The lower face 16 of the end wall 13 defines with the surface 10 of the bath an inlet 17, which is restricted in height, for molten glass which is delivered to the bath. The roof structure is extended to the tweel 2 by a roof element 18 and side walls 19 which form a chamber in which the spout 3, 4 is situated.

The lower face of the end wall 14 of the roof structure defines with the end wall 8 of the tank structure an outlet 20 for the ultimate ribbon of glass of desired thickness 21 which is discharged from the bath.

Driven conveying rollers 22 are mounted outside the outlet end of the tank and are disposed somewhat above the level of the top of the tank end wall 8. Superimposed driven rollers 23, one of which is shown, are provided and the rollers 22 and 23 co-operate to apply traction effort to the ribbon of glass 21 moving towards the outlet 20 from the bath. The ribbon 21 is directed by the rollers 22, 23 to a conventional tunnel lehr in which the ribbon is annealed, as is well understood in the art. On leaving the lehr the ribbon is cut into sheets of desired size.

The roof structure 11 is at intervals provided with ducting 24 connected by branches 25 to headers 26 through which a protecting gas is fed into the headspace 15 over the bath to create a plenum of protecting gas in the substantially closed headspace. The protecting gas is a gas which will not react chemically with the metal of the bath to produce contaminants for the glass, and therefore protects the bath surface at the sides of the ribbon and under the end of the stiffened ribbon 21 leaving the bath. Ingress of external atmosphere through the restricted inlet 17 and the outlet 20 is substantially prevented.

The inlet end wall 7 of the tank is extended forwardly under the spout 3, 4 as shown at 27 to provide confining walls which define a middle area of the bath into which area molten glass 28 is delivered at a controlled rate from the spout 3, 4. The tweel 2 regulates the rate of delivery of molten glass to the bath and the lip 3 of the spout is vertically spaced from the surface of the bath so that the molten glass 28 has a free fall of a few inches to the bath surface, which distance is sufficient to ensure a heel 29 of molten glass being formed behind the glass falling from the spout, which heel extends rearwardly to the end wall 7 of the tank structure.

The temperature of the bath is regulated at the inlet end of the bath by thermal regulators 30 immersed in the bath 9 and radiant heaters 31 in the headspace over the bath. The temperature of the molten glass 28 flowing over the spout is, in one method of operating according to the invention, about 1100° C. and the thermal conditions in the region of the confining walls 27 are such that a hot body 31 of molten glass is maintained in the middle area of the inlet end of the bath between the walls 27.

The hot molten glass 31 settles down on the surface of the bath as it advances between the walls 27 and when it reaches the end of these walls it is released from the downstream end of the body 31 and flows freely laterally of the bath as indicated at 32. Thermal regulators 33 in the bath and radiant heaters 34 in the headspace over the bath at the downstream end of the confining walls 27 ensure that the glass is maintained in molten condition as it is released from the downstream end of the hot body 31, its temperature being, for example, in the region of 1000° C. when working with soda/lime/silica glass, so that the desired free lateral flow of the molten glass is assured.

As this free lateral flow of the molten glass 32 is taking place the thickness of the glass decreases, and this free lateral flow is physically halted by laterally-adjustable non-wettable walls, shown as adjustable non-wettable fenders 35 which are mounted in the tank structure downstream of the confining walls 27 to define a laterally-adjustable channel for the glass down the bath. The distance between the fenders 35 is greater than the distance between the downstream end of the confining walls 27, and the fenders are laterally-adjusted so that they prescribe a channel width which physically halts the free lateral spreading of the molten glass when the layer of molten glass 36 has achieved a desired predetermined thickness. There is further settling down of the hot glass in the channel defined by the fenders 35, ensuring parallelism of the glass surfaces.

The temperature of the advancing layer of molten glass 36 of predetermined thickness is controlled by thermal regulators 37 in the bath and heaters 38 in the headspace, and the temperature of the upstream end of the confined layer of molten glass may be, for example, about 950° C. During its free lateral flow the thickness of the glass decreases, for example from a thickness of 17 millimetres at the downstream end of the hot body 31 to a thickness of 9.8 millimetres just after the free lateral flow of the glass has been halted.

The non-wettable fenders 35 are formed by two series of hollow channel-section carbon blocks mounted end-to-end and dipping into the bath surface 10 to form the channel. As shown in FIGURE 3 each of the blocks 35 is formed around a central steel channel 39 of rectangular section which is connected to tubular arms 40 which extend through and are adjustable in sealed apertures in the side walls 6 of the tank structure and support the blocks 35 in the desired position in the bath.

In order to enhance the non-wetting properties of the carbon faces 41 by ensuring minimal friction between the glass and the carbon faces, a cooling fluid, usually water, is circulated through the arms 40.

A pair of oppositely disposed edge rolls 42 is mounted in the channel to assist the advancement of the confined layer of glass between the non-wettable surfaces. The edge rolls 42 are mounted opposite each other in the channel just inside the carbon blocks 35, on shafts 43 which extend over the top of the carbon blocks 35. In the embodiment illustrated the edge rolls 42 are water-cooled carbon rolls and have knurled surfaces which engage the top surface of the margins of the layer 36 of molten glass in the channel, thereby assisting the advancement of the margins of the layer against the non-wettable surfaces 41.

In the arrangement illustrated the edge rolls 42 are mounted about half way along the fenders 35. It may be desirable to assist the advancement of the glass nearer the upstream end of the fenders 35, where the temperature of the glass is in the region of 950° C. to 1000° C. and edge rolls with peripheral teeth, in nature similar to the teeth of a sprocket wheel, may be employed for engaging the relatively hot glass marginally. The peripheral teeth of the edge rolls bite into the top surface of the margins of the hot layer of glass confined between the fenders 35 and are driven in the same way as the illustrated edge rolls 42 to assist advancement of the margins of the layer against the non-wettable surfaces of the fenders.

More than one pair of edge rolls may be employed, for example in addition to the edge rolls 42 a pair of toothed edge rolls of the kind just referred to may be provided near the upstream end of the channel.

By the time the glass reaches the downstream end of the channel it has been further cooled by thermal regulators 46 in the bath, and 47 in the headspace over the bath so that its temperature is in the region of 900° C. or below, at which temperature the viscosity of the glass is such that no further spreading of the glass takes place when the glass has advanced beyond the end of the channel. The advance of the glass along the bath continues and the glass is cooled as it is advanced by coolers 48 in the bath and the coolers 49 in the headspace until it is sufficiently stiffened to be taken off the bath as the ultimate ribbon 21 of glass of desired thickness.

The traction effort applied to the ribbon by the conveyor rolls 22 and 23 and the edge rolls 42 and 44 may be just sufficient to advance the ribbon of glass along the channel between the fenders without attenuating the ribbon to a thickness less than that achieved in the layer of molten glass 32 when its free lateral flow is halted. The traction effort applied by the conveyor rollers may be adjusted to trim the thickness of the ribbon. For example the thickness of the layer may be reduced from 9.8 millimetres down to 9.5 millimetres during its advance along the channel so that the ultimate ribbon of glass 21 which is discharged from the bath has a thickness of about 9.5 millimetres.

In some tests which have been carried out according to the method of the invention, a ribbon of glass 9.5 millimetres thick has been produced consistently with an output speed of 60 inches per minute.

Thicker glass can be manufactured by the method of the invention, for example glass 12.5 millimetres or 15 millimetres, by slowing down the speed of withdrawal of the formed ribbon by the conveyor rolls 21, 22 and 23, and also slowing down the speed of rotation of the edge rolls 42 so that a thicker layer of glass is confined between the fenders 35.

The invention thus provides an improved method for manufacturing flat glass having a thickness of 8 millimetres or more which glass, because it is developed on a bath of molten metal has flat, parallel surfaces and is free from distortion, these characteristics being enhanced by the free lateral spreading of the molten glass on the bath before that spreading is physically halted, as well as the settling of the hot glass on the bath surface both before and after the lateral spreading.

The invention also comprehends flat glass produced by the method set out above, and sheets of glass cut therefrom.

We claim:
1. Apparatus for use in the manufacture of flat glass in ribbon form comprising an elongated tank structure containing a bath of molten metal, means for delivering molten glass on to the middle area of the bath, means for confining the hot body of molten glass so formed on the bath to that middle area as it is advanced along the bath, temperature regulators mounted relative to the bath to maintain the hot glass in molten condition as it is released from said confining means thereby permitting free lateral flow of the released molten glass, laterally-adjustable non-wettable walls mounted in the tank structure downstream of said confining means to define a laterally-adjustable channel for the glass down the bath, means for adjusting the position of said walls to prescribe a channel width which halts said free lateral flow of the molten glass and edge rollers mounted just within and laterally of those walls so as to engage the top surface of the margins of the layer of glass so formed to assist the advance of the margins of the layer against said non-wettable walls.

References Cited

UNITED STATES PATENTS

| | | | |
|---|---|---|---|
| 3,266,880 | 8/1966 | Pilkington | 65—99 |
| 3,342,574 | 9/1967 | Jewell | 65—65 X |
| 3,356,478 | 12/1967 | Galey | 65—182 |

S. LEON BASHORE, Primary Examiner

J. H. HARMAN, Assistant Examiner

U.S. Cl. X.R.

65—99A, 182, 184